May 9, 1967
G. O. SINEX
3,318,071
METHOD AND APPARATUS FOR DEHYDRATING AND
SEPARATING LIQUIDS FROM
GASEOUS FLUIDS
Filed Nov. 23, 1964
6 Sheets-Sheet 4

INVENTOR
GENE O. SINEX
by
Mason, Kolehmainen, Rathburn and Wyss
ATTORNEYS

United States Patent Office 3,318,071
Patented May 9, 1967

3,318,071
METHOD AND APPARATUS FOR DEHYDRATING AND SEPARATING LIQUIDS FROM GASEOUS FLUIDS
Gene O. Sinex, P.O. Box 1177,
Farmington, N. Mex. 87401
Filed Nov. 23, 1964, Ser. No. 413,169
31 Claims. (Cl. 55—32)

The present invention relates to a method and apparatus for dehydrating and separating liquids from gaseous fluids and more particularly relates to a method and apparatus for treating well fluids of natural gas or oil-gas wells in order to remove liquids including water, oil and other liquid hydrocarbons therefrom, providing clean, dry gas for distribution to storage or for consumption.

The well fluids produced at the well head of a flowing natural gas or oil-gas well commonly contain water, water vapor, oil and other liquid hydrocarbons which are removed before the gas is utilized commercially or is suitable for transmission through pipelines. The well head fluids obtained from different wells may vary considerably in both the quantity and type of the various constituents that make up the fluid as well as in the temperatures and pressures of the fluid. Many types of liquid separators and dehydrating units have been proposed or utilized but these units have been effective over only a limited range of operating conditions and are relatively useless or inefficient when extreme operating conditions are encountered. Some gas producing wells having relatively large quantities of water, oil and other liquid hydrocarbons in the well fluid additionally have the characteristic of flowing initially at very high pressures and then gradually declining in pressure after a period of several hours or sometimes several days to pressures approaching normal line or operating pressures.

When treating well fluids from wells having the above characteristics, it is necessary to reduce the initial high pressure of the fluid down to a reasonable working pressure. This is generally done with a pressure reducing choke valve as the fluid enters a separator unit where the liquid components are separated from the gaseous fluid. Because of the adiabatic expansion of the fluid as the pressure is reduced, the temperature of the fluid is also reduced, creating problems of freezing and solidification of the liquid components as they are separated out.

In order to prevent freezing and solidification of the separated liquids and break up water-oil emulsions which may form, it is desirable to preheat the well fluid while at high pressures before it is reduced in pressure in the choke valve so that when the pressure of the fluid is reduced during expansion in the choke valve, the resulting temperature of the fluid will be sufficiently high to preclude freezing and solidification. Preheating of the well fluid is accomplished by passing the fluid through a high pressure flow coil surrounded by a high temperature heat transfer medium and the preheated fluid is then directed to the choke valve for pressure reduction as it enters the separator vessel. As the initial flow pressure of the well fluid declines toward a suitable operating pressure, it is no longer necessary to preheat the fluid (and in fact undesirable in many cases) so that the fluid can be introduced directly into the separating vessel through the choke valve without danger of freezing. However, it is still necessary to supply relatively large amounts of heat to the liquid collecting sections of the separator in order to break up water-oil emulsions. Previous types of dehydrating and liquid separating devices have not been able to inexpensively and satisfactorily provide the needed heat required at the desired points in the system to accommodate the varying flow characteristics of well fluids as they are encountered in various different locations.

Accordingly, it is an object of the present invention to provide a new and improved method and apparatus for treating well fluids involving a multi-component system wherein greater flexibility of heat application and flow control is obtainable resulting in increased operating efficiency.

It is another object of the present invention to provide a new and improved method and apparatus for removing unwanted liquid and vapors from a gaseous fluid flow operable over a wide range of pressure and temperature variations at high efficiency.

More specifically, it is an object of the present invention to provide a new and improved method and apparatus of the type described which efficiently utilizes and controls heat flow and application to prevent freezing and solidification of separated liquids and aid in breaking up water-oil emulsions that may be formed.

Another object of the present invention is the provision of a new and improved method and apparatus of the type described wherein gas powered lift means is utilized to provide positive circulation of a heat transfer medium through the system.

Yet another object of the present invention is the provision of a new and improved method and apparatus of the type described wherein gas is utilized for elevating and circulating a desiccant type heat transfer medium and is also utilized to aid in reconcentrating the medium during lifting or elevating action.

Still another object of the present invention is the provision of a new and improved system for dehydrating and separating liquids from a gaseous fluid stream wherein a liquid desiccant such as glycol is used for dehydrating the gas and as a heat transfer medium for heating the liquid separator and wherein gas powered lift means is provided for elevating the desiccant to insure positive circulation and for aiding in reconcentrating or removing moisture from the desiccant.

A further object of the present invention is the provision of a new and improved method and apparatus of the type described wherein new and improved are provided for separating the lift gas from the heat transfer medium after lifting and for preheating incoming lift gas before it reaches the medium.

Another object of the present invention is the provision of a new and improved method and apparatus of the type described wherein thermally responsive control means are utilized for controlling the circulation of the heat transfer medium to obtain proper operating conditions within the system.

In accordance with these and other objects of the invention, one embodiment of the present invention comprises a new and improved system for treating well fluids to remove liquids therefrom, comprising separator vessel having a choked well fluid inlet, a dry gas outlet and one or more liquid collecting sections for collecting water, oil and other liquid hydrocarbons separated from the well fluid introduced into the vessel. Freezing and solidification of these collected liquids is prevented and water-oil emulsions are broken up by the circulation of a heat transfer medium, such as water or a water-glycol medium through a heat exchange unit which is in an indirect heat transfer relation with the collected liquids in the vessel. Before the well fluid is introduced into the choke inlet of the vessel, the fluid may be preheated by passage through a high pressure flow coil situated in an indirect heater tank which contains a quantity of the heat transfer medium. A gas lift powered by gas from the well stream lifts the heat transfer medium from the indirect heater tank to an elevation where the medium then flows by gravity through the heat exchange unit to return to the supply vessel. The gas used in the circulating operation is separated from the heat transfer medium and forwarded to a burner for heating the medium in the tank.

Another embodiment of the present invention comprises a system having a liquid separator vessel as described and dehydrator means wherein the gaseous well fluid after the liquid components have been removed is passed in intimate contact with a liquid desiccant and heat transfer medium such as glycol to remove water vapor from the fluid. The glycol is circulated through a heat exchanger in the liquid collecting section of the separator vessel to a reboiler or glycol reconcentrating unit wherein the water contained therein is boiled off and removed. Positive circulation of the glycol through the system is accomplished by a gas lift powered by dry gas obtained from the separator vessel. In addition to the lifting action of the gas, moisture from the glycol is absorbed by the gas during the lifting process because of the intimate mixing of the gas and glycol thereby aiding in the reconcentration of the glycol.

Many other objects and advantages of the present invention will become apparent from considering the following detailed description in conjunction with the drawings in which.

Figure 1:
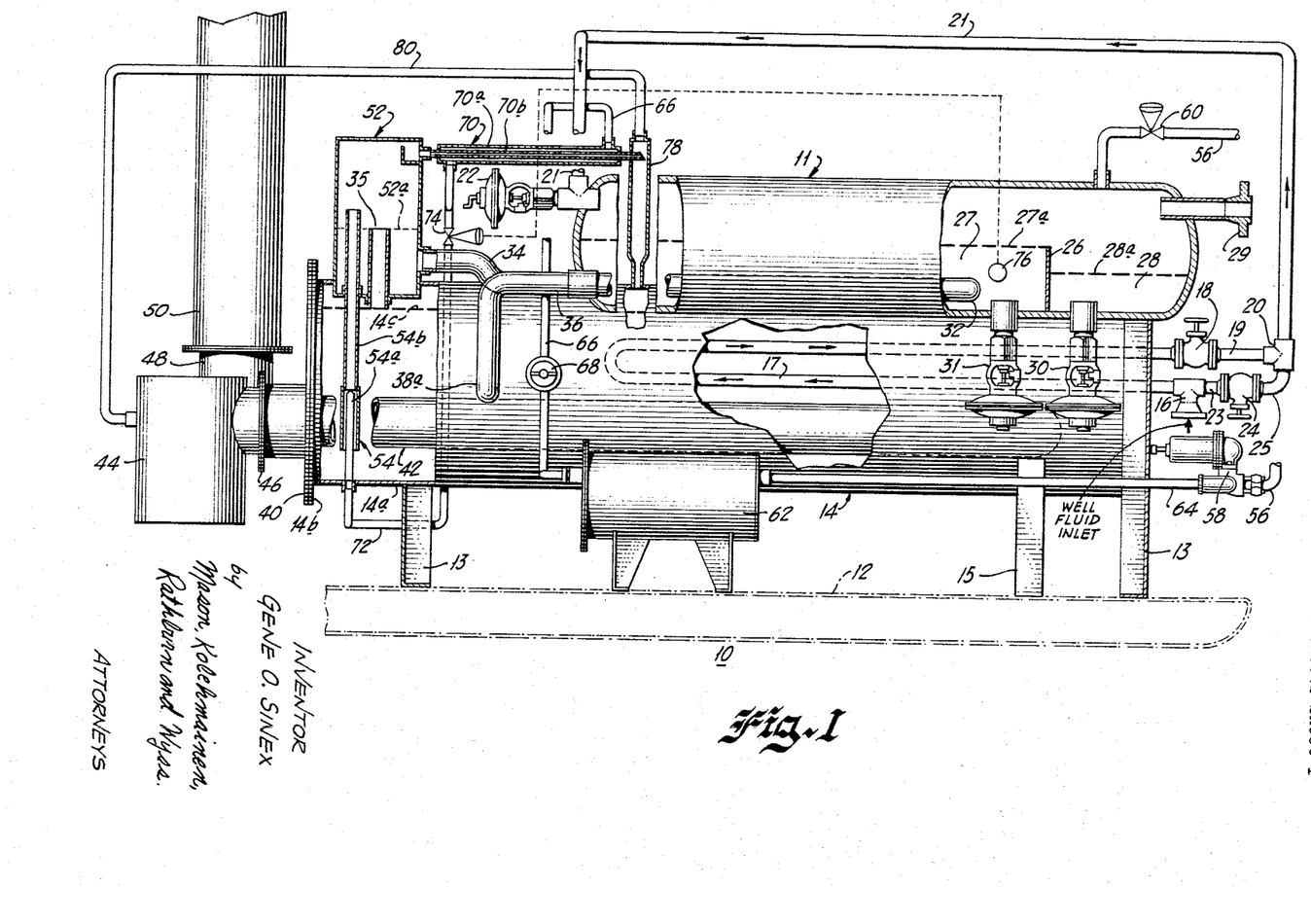
FIG. 1 is a side elevational view, with portions broken away, of one embodiment of a liquid separation system for use with well fluids constructed in accordance with the present invention.

Referring now to FIG. 1, therein is illustrated a new and improved liquid separation system 10 embodying the present invention for use in separating liquids, including water, oil and other liquid hydrocarbons, from well fluids available at the well head of a gas or oil-gas producing well. The system 10 includes a separator vessel 11 supported on a skid or base 12 by legs 13 and an indirect heater tank 14 supported on the skid by legs 15.

High pressure well fluid to be treated by the system is introduced into a T fitting 16 and flows through a high pressure flow coil 17 immersed in the heat transfer medium contained in the indirect heater tank 14 wherein the high pressure well fluid is preheated to an elevated temperature. The preheated well fluid passes out of the flow coil 17, through a shut-off valve 18, a conduit 19, a T fitting 20, and a supply pipe 21 to a pressure reducing inlet choke valve 22 wherein the pressure of the fluid is reduced as it is directed into the separator vessel 11. After the initial high flowing pressure of the well fluid has declined to a value so that it is no longer necessary to preheat the well fluid, the valve 18 is closed to bypass the high pressure flow coil 17 and the fluid then flows from the inlet T fitting 16 through a short conduit 23, an open valve 24 (note this valve is closed when the fluid is to be preheated in the flow coil 17) and an elbow fitting 25 to the T fitting 20, from which the fluid is directed to the choke valve 22 thorugh the inlet pipe 21 as previously described. Hence, when high well fluid pressures are encountered which require the preheating of the fluid, the valve 24 is closed and the valve 18 is open so that the fluid will pass through flow coil 17 before reaching the choke valve 22. When lower well fluid pressures no longer require preheating of the fluid, the valve 18 is closed and the valve 24 is opened so that the flow coil 17 is bypassed and the fluid flows directly to the choke valve 22 without preheating.

The choke valve 2 is preferably of the type shown in my co-pending U.S. application Ser. No. 279,370, filed May 10, 1963, and is adjustable so that the pressure of the well fluid entering the vessel 11 can be maintained at the desired level. The separator vessel 11 comprises an elongated pressure enclosure having one or more upstanding weirs 26 which divide the lower portion of the vessel into a plurality of liquid collecting sections 27 and 28. The choke valve assembly 22 serves as a fluid inlet for the vessel and directs a flow of well fluid in a generally horizontal direction above the liquid collecting sections so that liquid components in the horizontal stream will drop out by gravity and collect in the collecting sections. The upper portion and right-hand end (as viewed in FIG. 1) of the vessel serve as a dry gas collecting space and a dry gas outlet 29 is provided to direct the dry gas from the vessel to suitable transmission or storage lines (not shown). Mechanical scrubbers and baffles (not shown) may be provided in the vessel to aid in the mechanical separation of these solid and liquid constituents of the well stream and dehydrating apparatus (not shown) can be provided for further removal of liquid and vapors from the gas prior to reaching the dry gas space at the right-hand end of the vessel. The construction and placement of these scrubbers, baffles and dehydrating elements within and associated with the vessel 11 can, for example, be of the general type shown in United States Patent No. 3,132,987 or in the co-pending application of Gene O. Sinex, Ser. No. 279,370, filed May 10, 1963.

The liquid constituents collected in the section 27 generally include water in addition to oil and other liquid hydrocarbons which float on top of the heavier water. The level of the collected liquids within section 27 rises until it reaches an upper level 27a even with the top of the weir 26, and the lighter oil and other liquid hydrocarbons floating at the top flow over the weir into the next collecting section 28 which can be termed an oil collecting section. The oil which collects in section 28 is maintained at or below an upper level indicated as 28a by means of a float operated level controller actuating valve 30 which opens and closes intermittently to discharge collected liquid from the section 28. Another float operated level controller actuating valve 31 is provided for the first liquid collecting section 27. The valve 31 opens and closes intermittently to discharge water from the bottom of the section to prevent the water level from rising to a level even with the top of the weir 26 and then flowing into the oil collecting section 28.

Because of the pressure reduction in the well fluid as it passes through the choke valve 22 into the vessel 11, the temperature of the fluid is reduced and many of the constituents of the well fluid condense out of the stream in liquid or solid form and are collected in the collecting sections 27 and 28. In order to prevent these collected liquids from freezing and to melt any collected crystals and break up water-oil emulsions, a heat exchanger 32 is positioned within the collecting section 27 in indirect heat exchange with the collected liquids therein.

The heat supplied by the exchanger 32 is in addition to the heat supplied to the well fluid during preheating in the flow coil 17 and this additional heat is necessary in a normal system to break up water-oil emulsion and prevent paraffin accumulations as well as for other reasons and is especially necessary when the well fluid is by-passed directly to the choke valve 22 without preheating.

The heat exchanger 32 is constructed of steel tubing or pipe and has an inlet line 34 for receiving a flow of heated liquid heat transfer medium such as water, or a water-glycol mixture, a quantity of which is contained in the indirect heater tank 14. The heated transfer medium flows through the heat exchanger 32 and gives up heat to maintain the vessel and the liquid collected in the liquid collecting sections at the desired temperature. After the heat transfer medium flows through the heat exchanger 32, it passes through an outlet line 36 and is returned to the tank 14. The indirect heater tank 14 is a generally cylindrical tank of relatively large capacity for holding a considerable quantity of the liquid heat transfer medium and comprises a cylindrical outer shell 14a with an annular end flange 14b and a circular end plate 40. The end plate 40 can be removed when it is desired to clean out the tank and is attached to the flange 16b by suitable bolts or other fasteners (not shown). A similar flange and end plate (not shown) is provided at the opposite ends of the tank so that the high pressure flow coil 17 can be removed if desired.

In order to heat the liquid transfer medium within the tank 14, there is provided a fire tube assembly which includes a U-shaped fire tube 42 having a central bight portion at the right-end of the tank (FIG. 1) and a pair of legs which extend outwardly through the end plate 40. One of the legs of the fire tube 42 is connected to a gas burner assembly 44 by a flanged connection 46, and the other leg of the fire tube is provided with an upturned elbow fitting 48 to which an exhaust stack 50 is attached. The products of combustion from the burner assembly 44 pass through the fire tube 42 and then out through the stack 50. The fire tube is relatively large in diameter to provide a large heat exchange area between the combustion products passing through the tube and the liquid heat transfer medium within the tank. The transfer medium within the heating tank 14 is maintained at an appropriate level 14c above the fire tube assembly 42 to prevent overheating and burn out of the tube and the flow coil 17 is preferably positioned in the tank below the upper liquid level 14c to provide good heat transfer between the liquid heat transfer medium and the well fluid in the coil 17.

To provide positive means for circulating the liquid heat transfer medium through the heat exchanger 32, an elevated sump comprising a closed sump chamber 52 is disposed adjacent the left-hand end of the indirect heater tank 14. The sump chamber 52 extends upwardly from the top of the tank, and the interior of the chamber is in communication with the inlet line 34 leading to the heat exchanger 32. In order to limit the head of transfer medium in the sump chamber 52 and to equalize the pressure between the sump chamber and the indirect heating tank 14 an upstanding drain and vent pipe 35 is disposed to extend upwardly from the tank through the bottom and into the chamber.

Should the liquid heat transfer medium delivered to the sump chamber 52 rise to a level 52a adjacent the open end of the upstanding drain pipe 35, it is then returned to the tank 14 through the drain pipe. Since the bottom of the sump chamber 52 is higher than the upper liquid level 14c in the indirect heater tank and the heat exchanger 32 is connected between the two, the liquid heat exchange medium flows under positive head from the sump chamber through the heat exchanger 32 and back to the tank 14 and, in doing so, provides a large amount of heat for maintaining the desired operating temperature and warming the liquids collected within the liquid collecting sections of the vessel.

In order to elevate heated liquid from the indirect heater tank 14 into the sump chamber 52 for circulation through the heat exchanger 32, there is provided within the tank a gas-powered lift mechanism 54 positioned adjacent the hottest end of the fire tube assembly 42 between the legs thereof. The lift means 54 includes an inner, upstanding gas nozzle 54a partially surrounded by a concentric, upstanding (outer) riser pipe 54b which extends upwardly into the sump chamber 52. The upper end of the riser tube 54b is open so that as the mixture of gas and liquid heat transfer medium flows upwardly through the riser 54b, it will spill out the open end with the liquid medium moving downwardly by gravity to collect in the lower portion of the sump chamber. The lower end of the riser 54b surrounds the jet nozzle 54 and is open to permit the heated liquid medium in the tank 14 to flow into the riser wherein it is entrained in the gas stream from the nozzle 54a and is lifted into the sump chamber 52.

The level of liquid heat transfer medium within the sump chamber 52 depends upon the rate that the medium is elevated by the lift means 54 and the flow resistance between the sump chamber and heater tank through the heat exchanger 32. The liquid level in the chamber is free to rise and fall and will rise to a height wherein the head is just sufficient to overcome the flow resistance encountered. As the transfer medium lift rate is increased, the liquid level or head in the sump 52 rises and the flow rate of the liquid heat transfer medium rises. This increases the flow resistance through the system until the increased head in the sump is balanced. Conversely, as the transfer medium lift rate is decreased, the flow rate of heat transfer medium through the heat exchange decreases and the flow resistance is decreased, keeping a balance between the head in the sump and the flow resistance of the system and, accordingly, the liquid level in the sump chamber falls. If the lift rate of the medium were to be increased to such an extent that the liquid level would tend to rise above the level 52a to completely fill the sump chamber 52, the drain and vent pipe 35 serves as an overflow pipe in addition to a pressure equalizer, so that the separation of the liquid medium and lift gas can be effected in the top portion of the chamber.

For the purposes of supplying lift gas to the nozzle 54a for elevating the liquid heat transfer medium into the sump chamber 52, a gas line 56 is connected between the gas outlet 29 or the gas-collecting space at the right-hand end (FIG. 1) of the separator vessel 11 and a pressure reducer 58. A shut-off valve 60 is provided in the line 56 to permit the supply of gas from the vessel to the regulator 58 to be controlled or shut off completel yif desired. After the gas is reduced in pressure by the regulator 58 to be controlled or shut off completely if a connecting line 64. The drip unit furnishes gas for other instruments as well as lift gas, and lift gas flows from the unit 62 through a line 66 having a control valve 68 therein to an outer jacket or shell 70a of a heat exchanger type, separating or condensing unit 70 wherein the lift gas absorbs heat prior to entry into the indirect heater tank 14. The preheated lift gas then flows out of the condensing unit 70 to the nozzle 54a through a line 72 having a thermostatically controlled flow control valve 74 installed therein. The valve 74 is controlled by a thermally responsive sensing unit 76 positioned within the vessel 11 in the collecting section 27. The flow of gas to the lift nozzle 54a, and accordingly the flow rate of liquid heat transfer medium elevated into the sump chamber 52, is thus controlled in respect to the temperature of the collected liquid in the section 27 and the separator vessel 14. As the temperature drops, the sensing unit 76 calls for more heat and opens the control valve 74 so that more gas flows through the line 72 to the lift nozzle 54a. The increase in the flow rate of lift gas to the nozzle 54a elevates the heated liquid transfer medium into the sump chamber 52 at a faster rate with a corresponding increase in the flow rate of the heat transfer medium through the heat exchanger 32. Heat is transferred from heat transfer medium flowing through the heat exchanger 32 to the vessel at a faster rate because of the increased flow, raising the temperature of the liquid in the collecting sections and the vessel, and the sensing unit 76 then calls for less heat to reduce the flow rate of lift gas. In this manner, the separator vessel is continually maintained at the desired operating temperature to insure maximum efficiency in the separation of liquids from the well stream and to prevent freezing or solidification of the collected liquids and breakup of any water-oil emulsions.

As the mixture of heat transfer liquid and lift gas moving upwardly in the riser tube 54a reaches the upper open end thereof, the major portion of the liquid medium is separated from the gas by gravity and collects or drops into the lower portion of the sump chamber for circulation through the heat exchanger 32. After this separation occurs, the remaining gas in the upper portion of the sump chamber may still contain considerable amounts of the transfer medium in droplet and vapor form. Since lift gas from the sump chamber 52 is utilized for fuel in the burner 44, it is desirable to remove from the gas as much as possible the remaining droplets and vapor of the heat transfer medium and return this medium to prevent excessive loss of heat transfer medium and consequently high operating costs. In order to accomplish this removal, the gas is passed through a central tube 70b of the heat exchanger and condensing unit 70.

The lift gas passing through the tube 70b has been raised in temperature by the intimate contact with the heated transfer medium during the lifting process and consequently heat is available therefrom to preheat incoming gas passing through the outer jacket 70a prior to entering the lift means 54. As heat exchange takes place in the condensing unit, gas within the central tube 70b is cooled, and the transfer medium remaining therein begins to condense out in liquid form on the walls of the tube. The condensed heat transfer medium flows concurrently with the gas until reaching the open end of the tube 70b (right-hand end as viewed in FIG. 1), which is in communication with an upstanding return stack 78 wherein the medium is returned to the heater tank 14. The dry gas entering the return stack 78 moves upwardly out of the stack through a waste line 80 connected to the burner unit 44 wherein the gas is used as additional fuel for providing heat for the fire tube assembly 42.

Only a relatively small amount of lift gas is needed to provide the required circulation rate of the heat transfer medium and accordingly the burner 44 is also supplied with a much larger quantity of gas from the system in order to furnish the heat for heating the transfer medium in the indirect heater tank 14. This larger quantity of gas may be supplied to the burner unit from the dry gas collecting space of the separator vessel and is controlled by a temperature sensitive device in the heater tank 14 (not shown in the drawings). The condensing unit 70 thus prevents the loss of excessive amounts of the liquid heat transfer medium from the system and provides means for preheating of the lift gas before it flows into the lift means 54. The use of the gas lift means 54 eliminates the need for external pumps and control mechanisms and in addition the gas used for lifting is not wasted but is used for supplying heat energy to the heat transfer medium in the indirect heater tank.

Figure 2:
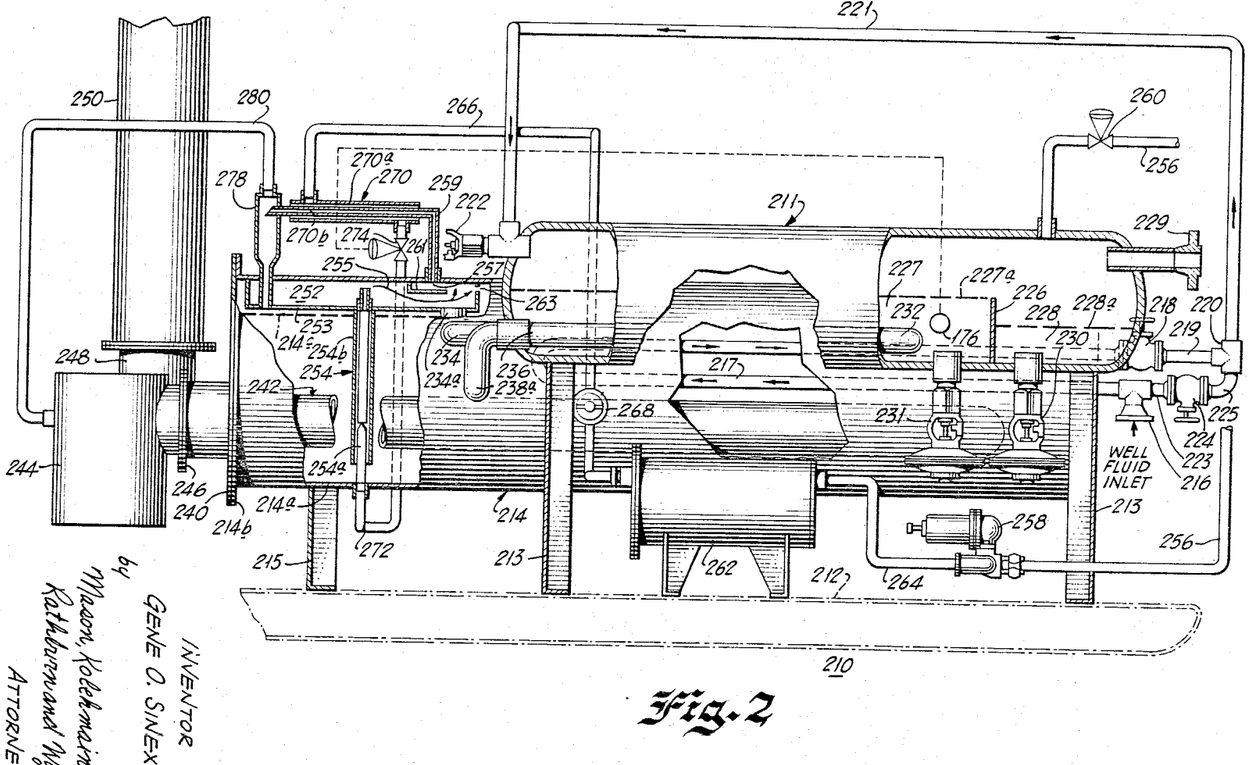
FIG. 2 is a side elevational view, with portions broken away, of another embodiment of a liquid separation system for use with well fluids constructed in accordance with the present invention.

Referring now to FIG. 2, therein is illustrated another embodiment of a new and improved liquid separation system 210 constructed in accordance with the features of the present invention. The system 210 is generally similar in operation and construction to the system 10, and the reference numerals applied to elements in the system 210 that have counterparts of the system 10 are the same with an added prefix digit "2." As an example, the separator vessel 11 in the system 10 shown in FIG. 1 is identified as "211" in the system 210 shown in FIG. 2. Because of the similarity of many of the components of the systems 10 and 210, only the differences between the two systems are described in detail.

The system 210 is provided with an indirect heater tank 214 similar to the tank 14 but including an internal sump chamber 252 within the upper portion thereof adjacent the left-hand end (FIG. 2) of the tank. The sump chamber 252 is formed with a bottom pan or plate 253 disposed at a level above the upper liquid level 214c in the indirect heater tank so that the heat transfer fluid which is elevated into the sump chamber by gas lifting action will flow under positive pressure into the inlet 234 and through the heat exchanger 232. The inlet 234 is provided with an upwardly opening elbow 234a which is disposed in a bottom outlet opening in the pan 253 so that the liquid medium will flow downwardly from the sump chamber into the heat exchanger 232.

A gas-powered lift unit 254 is disposed within the tank 214 and includes a riser tube 254b having an upper open end which extends upwardly into the sump chamber 252 above the level of the pan 253 so that as the transfer medium is lifted by the action of the gas lift unit 254, the liquid will spill onto the pan by gravity and flow into the inlet of the elbow 234a of the heat exchanger line 234. The lift gas entering the sump chamber 252 with the liquid medium flows in the direction of an arrow 255, allowing most of the liquid medium carried in the gas stream to separate out by gravity and collect in the pan 253. The gas then flows upwardly through an outlet 257 in the top of the chamber 252 into a conduit 259 connected to an inner tube 270b of the heat exchanger type condensing and separating unit 270. A horizontal baffle 261 is provided below the outlet 257 to prevent liquid medium from splashing upwardly into the conduit 259, and a vent and overflow opening 263 is provided in an end wall of the sump chamber 252 to equalize the pressure between the sump chamber and the indirect heater tank 214 and to allow the liquid medium to flow back to the tank should the liquid level in the chamber 252 rise to the level of the vent. A liquid medium return stack 278 extends downwardly through the sump chamber 252 into the tank 214 so that any heat transfer liquid condensed out in the unit 270 is returned to the tank. Incoming gas to the gas lift 254 is preheated as it passes through an outer jacket 270a of the condensing unit 270, and the gas is flow controlled by a thermostatically controlled valve 274 in a manner similar to that of the system 10.

The sump chamber 252 is formed within the indirect heater tank 214 and does not extend upwardly above the tank as in the system 10 of FIG. 1. This reduces the vertical height of the system 210 and also avoids any heat loss occasioned by the exposed surfaces of the sump chamber such as may be encountered in sump chamber 52 of the system 10. Further, overflow and venting of the sump chamber 252 are accomplished through the opening 263 and a separate pipe is not required. The liquid level in the sump chamber 252 will rise and fall in a manner similar to that described in connection with the chamber 52 in the embodiment of FIG. 1.

Figure 3:
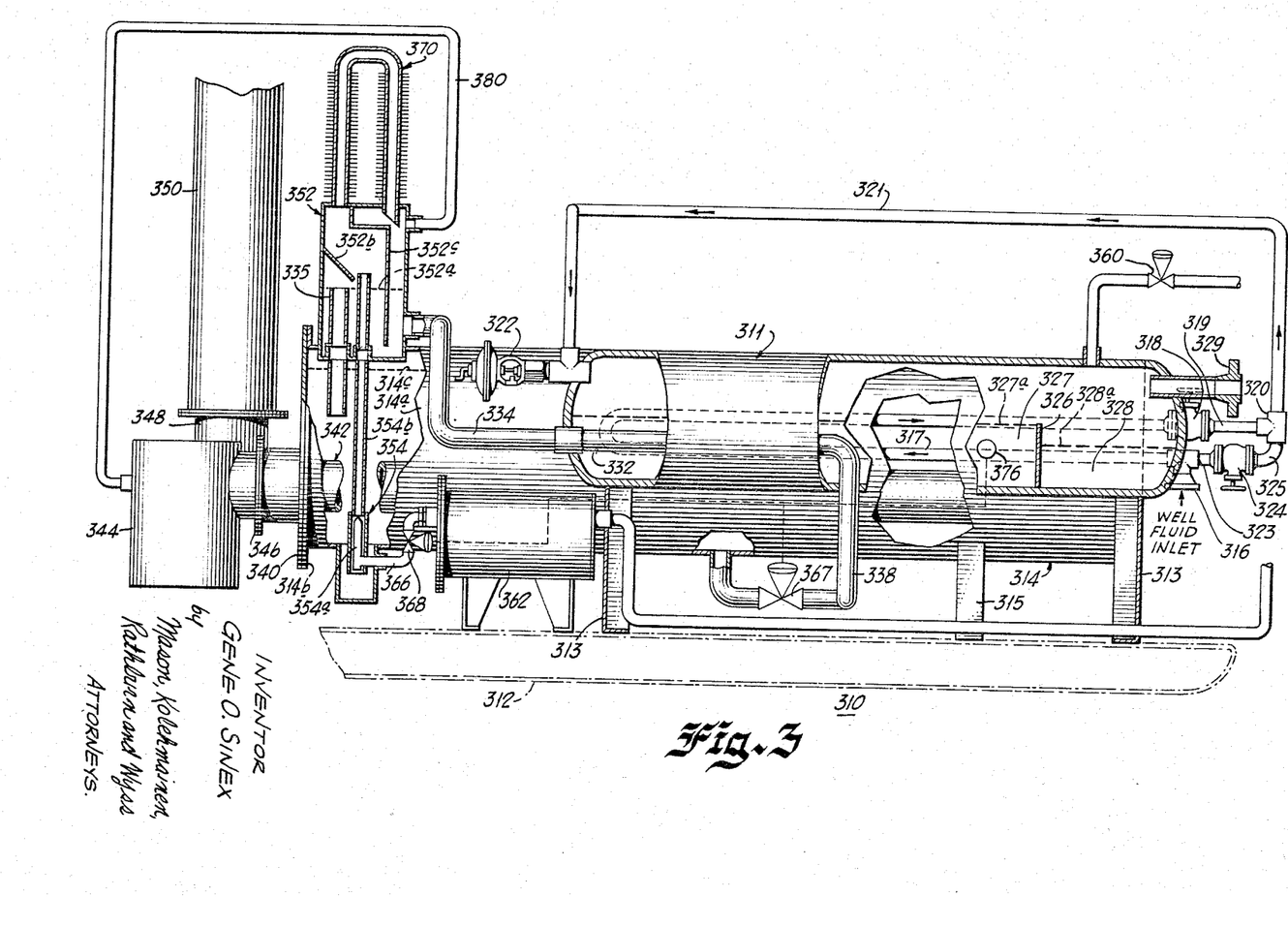
FIG. 3 is a side elevational view, with portions broken away, of yet another embodiment of a liquid separation system for use with well fluids constructed in accordance with the present invention.

Another embodiment of a liquid separation system 310 constructed in accordance with the features of the present invention is shown in FIG. 3 of the drawings. The system 310 is similar in construction and operation to the systems 310 and 210, and similar components in the system 310 are identified by identical reference numbers to which the prefix digit "3" is added. As an example, the separator vessel, which is identified as 11 in the system 10 and as 211 in the system 210, is designated by the reference number "311" in the system 310. In view of this similarity, a detailed description of only the structures and operations of the components that differ from the preceding systems is set forth in detail.

The system 310 includes a sump chamber 352 similar to the chamber 52 (FIG. 1) mounted at one end of the indirect heater tank 314 for providing a flow of heated transfer medium under positive pressure to a heat exchanger 332 within the liquid collecting section 327 formed in the separator vessel 311. Heated medium from the sump chamber 352 passes out through a side outlet in the chamber into an inlet tube 334 of the heat exchanger 332. Heated transfer medium from the heater tank 314 is elevated to the sump chamber 352 at a controlled rate by means of a gas-powered lift unit 354 similar to the units 54 and 254. Since the heated medium within the sump chamber 352 is at a higher elevation than the level 314c in the tank 314, there is a positive gravity head or pressure acting on the medium as it flows from the sump chamber through the heat exchanger.

The heat transfer medium circulated through the heat exchanger 332 passes back into the bottom of the heating tank 314 through an outlet line 338 having installed therein a thermostatically controlled liquid flow control valve 367. The control valve 367 is connected to a temperature sensing device 376 positioned within the liquid collecting section 327 of the separator vessel 311. As the sensing unit 376 calls for more heat, the liquid medium control valve 367 is opened to allow more medium to flow through the heat exchanger 332 to heat the vessel and particularly the liquid collected in section 327. The flow of liquid heat transfer medium to the heat exchanger in the system 310 is controlled directly by a valve rather than indirectly as in the other embodiments wherein the gas flow to the gas lift is controlled to effect the desired circulation rate. However, in order to conserve gas and provide for greater operating efficiencies, the sensing unit 376 is also connected to control a gas flow valve 368 in a gas line 356 which supplies lift gas to the medium elevating lift device 354. The sensing unit 376 thus directly controls the flow rate of heated liquid heat transfer medium by means of the valve 367 and indirectly by controlling the flow rate of lift gas through the valve 368.

The sump chamber 352 is provided with a sloping baffle 352b disposed above the open upper end of the overflow and pressure equalizing vent pipe 335 in order to prevent liquid medium in the upper portion of the sump chamber from falling directly into the overflow tube as it condenses. The baffle 352b also prevents liquid medium from the riser tube 354b from splashing over into the vent and drain pipe 335 and thus being bypassed directly to the heater tank without passing through the heat exchanger. Another baffle 352c in the sump chamber 352 includes a horizontally disposed section directly above the open upper end of a riser tube 354b of the lift device 354 and a vertically disposed portion extending downwardly between the riser tube 354b and the outlet to the inlet line 334. The vertical portion of the baffle 352c directs the transfer medium in the sump chamber toward the bottom thereof before the medium can flow into the inlet line 334. Because of the reversing direction of flow within the sump chamber 352, any solid particles or sediment within the liquid medium tends to settle to the bottom of the sump chamber.

A condensing and separating unit 370 somewhat different from the units 70 and 270 in the previously-described systems 10 and 210 includes an upstanding, inverted, U-shaped condensing tube having external cooling fins on the upstanding legs. The lower ends of the legs of the U-tube are connected to the upper portion of the sump chamber 352 and lift gas within the sump chamber passes upwardly through the left-hand leg of the tube and downwardly in the right-hand leg. The vertical portion of the baffle 352c extends downwardly below the upper liquid level in the sump chamber and divides the chamber into two portions in order to prevent lift gas from flowing directly out of the chamber without first passing through the unit 370. As the gas moves through the U-shaped tube, it is cooled, and the liquid medium carried in the stream condenses on the walls of the tube and flows back into the sump chamber by gravity. After the lift gas has passed thorough the unit 370 for cooling and separation of the liquid medium, it passes through a waste line 380 to the burner 344 for combustion. Since the direction of the gas flow through the unit 370 is reversed, separation of the liquid medium therefrom is aided by gravity in addition to the condensing action caused by external cooling action of surrounding atmosphere on the cooling fins of the U-tube.

The unit 370 is used where there is no danger of freezing of the heat transfer medium vapors in the lift gas and provides a relatively simple means of effecting separation of the heat transfer medium from the lift gas as well as cooling the gas before it reaches the burner 344.

Figure 4:
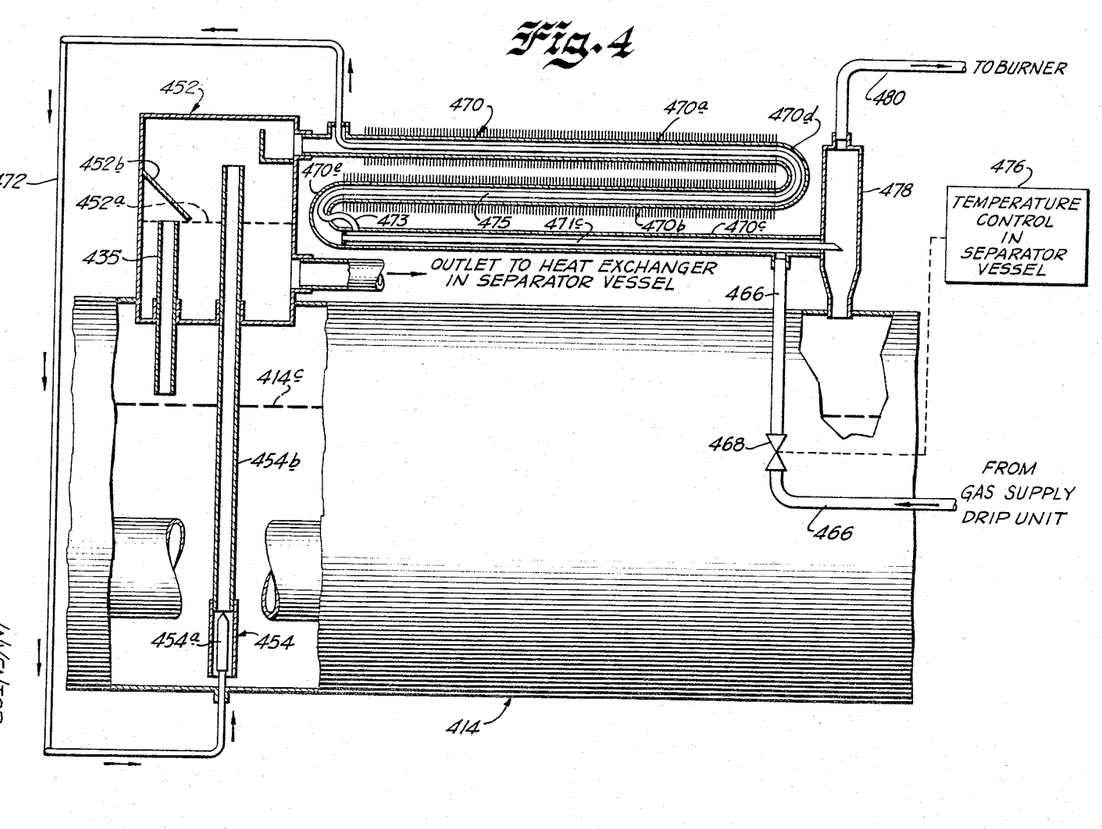
FIG. 4 is a schematic elevational view, of an embodiment of a combination air-gas cooled heat transfer medium condenser and recovery system constructed in accordance with the present invention.

Referring now to FIG. 4 of the drawings, therein is illustrated a schematic elevational view of a combination air-gas cooled heat transfer medium condenser and recovery system 470 constructed in accordance with the present invention. The system 470 can be utilized with any of the separator systems 10, 210 and 310 previously described and provides means for recovering the liquid heat transfer medium from the lift gas by utilizing incoming lift gas for cooling in addition to cooling action of the atmosphere on external cooling fins. Incoming lift gas from the supply gas drip unit or dry gas end of the separator vessel is directed through a supply line 466 to the lower right-hand end (FIG. 4) of the condensing unit 470. A control valve 468 is provided in the line 466 for controlling the flow rate of incoming lift gas and a temperature sensitive device 476 disposed in the separator vessel (not shown) is connected to actuate the valve in response to the temperature of the vessel and the collected liquids therein as previously described.

The condensing unit 470 comprises an outer jacket of a somewhat S-shaped tubular structure having an upper pass 470a, a central pass 470b, and a lower pass 470c, and the passes are connected together by 180-degree elbows or turns 470d and 470e as shown in the drawings. External air cooling fins are disposed along the length of the upper two passes 470a and 470b so that the warm lift gas moving through these passes will be cooled by the surrounding air and the liquid heat transfer medium contained therein will begin to condense and collect in the passes. An inner concentric tube 471c axially disposed within the third or lower pass 470c is connected to the interior of the elbow 470e in order to drain the collected liquid medium and cooled lift gas from the upper two passes into an upstanding return stack 478 at the right-hand end of the unit.

The lower end of the return stack 476 is in communication with the upper portion of an indirect heater tank 414 so that the collected liquid heat transfer medium flowing through the tube 471c will be returned to the tank. The cooled lift gas reaching the return stack 476 moves upwardly and out the top thereof into a waste line 480 which is connected to a burner unit (not shown) for the indirect heating tank.

The incoming lift gas from the supply line 466 is connected to the lower pass 470c and flows toward the left-hand end of the pass in a direction opposite the direction of flow in the tube 471c. During this period the incoming lift gas is warmed somewhat, and the outgoing lift gas and transfer medium in the tube 471c is cooled to a further degree insuring that the separation of gas and liquid in the upper two passes is maintained and additional liquid in the gas is separated out.

After the incoming lift gas moves through the lower pass 470c, it is directed through a somewhat S-shaped small diameter tube 473 which is connected to an inner concentric tube 475 centrally disposed along the upper two passes 470a, 470b and elbows 470d and 470e. As the lift gas passes through the tube 475, it is preheated because of the counter current flow of warm lift gas and separated liquid medium in upper two passes surrounding the tube. The tube 475 is connected adjacent the left-hand end of the upper pass 470a to a supply line 472 which conducts the preheated lift gas to a nozzle 454a of lift pump means 454 for elevating the heat transfer medium in the heater tank 414 through the riser tube 454b into the sump chamber 452. Because of the intimate contact in the lift pump mechanism between the preheated lift gas and the heated liquid medium in the tank 414, the lift gas is elevated in temperature somewhat and upon reaching the upper end of the riser tube 454b where the major portion of the liquid medium spills out into the sump chamber, the gas rises to the top of the chamber and flows into the inlet (left-hand end) of the upper pass 470a of the condensing unit. At this time the lift gas entering the pass 470a is at an elevated temperature and contains quantities of the heat transfer medium in droplet or vapor form which is condensed out and separated from the gas in the condensing unit 470 as described.

The condensing system 470 provides an efficient means for preheating the incoming lift gas as well as cooling the outgoing lift gas from the sump chamber to condense out the heat transfer medium and prevent the loss thereof. The system 470 combines the advantageous features of both types of lift gas separating units such as the units 70 and 370 in that external air cooling is provided by means of the fins and also cooling of the outgoing lift gas and preheating incoming lift gas is accomplished.

Figure 5:
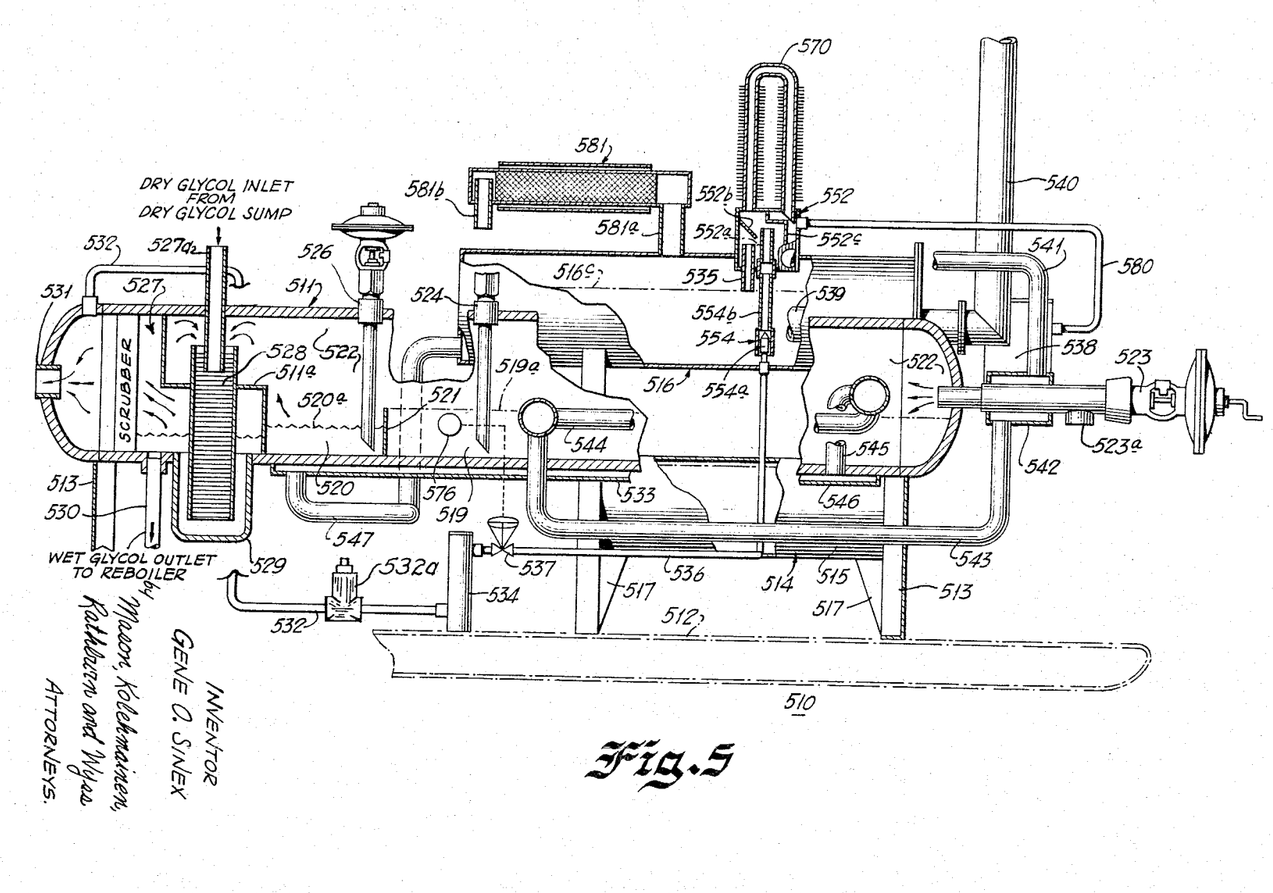
FIG. 5 is a side elevational view, with portions broken away, of an embodiment of a multi-component liquid separation and dehydration system constructed in accordance with the present invention.

Referring now to FIG. 5, therein is illustrated a multi-component liquid separation and dehydration system 510 constructed in accordance with the features of the present invention. The system 510 is generally similar to the apparatus described in United States Patent No. 3,132,987 and includes a separator vessel 511 supported on a skid or base 512 by suitable support structures or legs 513 and a glycol reconcentrating system 514 including a glycol sump tank 515 and glycol reboiler 516, both of which may be supported on leg structures 517 carried on the skid 512.

The separator vessel 511 is generally similar to that shown and described in the aforementioned co-pending Sinex patent application and includes a plurality of liquid collecting sections 519 and 520 separated by an upstanding weir 521 and a gas collecting space 522. Well fluid is introduced into the vessel through an adjustable pressure reducing choke valve mechanism 523 at the right-hand end of the vessel and the well fluid can be preheated prior to delivery to the choke valve by passage through a high pressure flow coil (not shown) in a manner similar to that described in the specification relating to the embodiments shown in FIGS. 1, 2 and 3. Well fluid either from the high pressure flow coil or direct from the well head enters an inlet 523a of the choke valve and is reduced in pressure as it enters the vessel. Any liquid components of the well stream including water, oil and other liquid hydrocarbons gravitate out of the generally horizontal stream entering the vessel and collect in the liquid collecting sections 519 and 522. Water collected in section 519 being heavier than the oil and other liquid hydrocarbons gravitates toward the bottom of the section with the lighter fluids floating on top.

When the liquids collected in section 519 reach a level 519a even with the top of the weir 521, the lighter, floating oil components spill over into the next collecting section 520 which can be aptly termed an oil collecting section. A float operated level controlling actuating valve 524 is disposed in section 519 to open and close intermittently to discharge collected water in the section and maintain the upper level of the water below the level 519a to prevent water from spilling over into the oil colecting section 520. A somewhat similar valve 526 is provided in section 520 to remove the oil and other liquid hydrocarbons from the vessel and maintain the liquid at or below a selected upper level 520a.

The left-hand end of the vessel 511 comprises a dehydrating section 527 separated from the gas-collecting space 522 and liquid collecting sections of the vessel by means of a baffle 511a. A stream of substantially anhydrous dehydrating liquid or desiccant such as glycol is injected into the dehydrating section through a line 527a and descends concurrently downwardly in a contactor 528 with gas from the collecting space 522 of the vessel. During the downward concurrent flow in the contactor 528, dry glycol is passed in intimate contact with the gas and picks up moisture therefrom to further dehydrate the well gas. The lower end of the contactor is enclosed by a downwardly extending wet glycol sump 529 in which the wet glycol and dried gas collects. The dried gas then moves upwardly in a stream of bubbles until reaching the top level of the liquid glycol in the dehydrating section 527 and then moves through a scrubber into the left-hand or dry-gas end of the vessel. Wet glycol in the sump 529 and dehydrating section 527 is removed through an outlet line 530 and returned to the glycol reboiler 516, and dry gas in the left-hand end of the vessel flows through a dry gas outlet 531 to a storage or distribution line for consumption.

In addition to the use of the glycol as a liquid desiccant for the dehydration of the well gas, the glycol is also utilized as a liquid heat transfer medium for maintaining the separator vessel 511 at the proper operating temperature. Dry gas from the vessel 511 is utilized for lifting the glycol in the reboiler 516 to an elevated sump chamber 552 (similar to the chambers 52 and 352 of FIGS. 1 and 3) from which the glycol flows under positive head through the various components of the system and back to the tank. Lift gas from the dry gas end of the dehydrating section 527 of the vessel is directed through a line 532 and pressure regulator 532a to a supply gas drip unitl 534 and is directed from the drip unit via a conduit 536 to a nozzle 554a of a gas lift until 554 in the reboiler 516. The lift unit includes a vertical riser tube 554b having an open lower end in communication with the glycol in the reboiler and surrounding the nozzle 554a so that the lift gas will entrain the glycol in an upwardly moving stream through the riser tube. The upper end of the riser tube 554b extends upwardly into the sump chamber 552 above the bottom thereof and the liquid glycol moving upwardly in the riser tube will spill out the top of the riser and collect in the bottom of the sump chamber. The sump chamber is provided with an upstanding pressure equalizing vent and return pipe 535 which limits the upper level 552a of the liquid in the sump chamber and allows return of condensed glycol to the reboiler. As discussed in connection with prior embodiments, the liquid level will rise and fall in the sump chamber in response to the flow rate of the lift gas and the resistance to flow of glycol through the various components.

A control valve 537 in the lift gas supply line 536 controls the flow rate of left gas to the gas lift 554 in response to a temperature sensing device 576 located in the liquid collecting section 519 of the separator vessel 511. The dry gas entering the lift means 554 passes upwardly in a concurrent stream with the partially reconcentrated glycol in the reboiler 516. During this passage there is intimate intermixing of the dry gas and the partially reconcentrated glycol, and the dry gas absorbs moisture from the glycol to aid in further reconcentrating the glycol. When the mixture of gas and glycol reaches the sump chamber the major portion of the glycol returns by gravity to the lower part of the sump for circulation. The lift gas then passes through an upstanding air-cooled, externally finned tube condensing unit 570 wherein glycol carried by the gas stream in liquid droplet or vapor form is condensed and returns to hte sump chamber 552. The baffle 552c divides the sump chamber into two portions in order that the lift gas will pass upwardly from the left-hand side of the chamber through the left-hand tube of the condenser unit and then down the right-hand tube of the condenser unit into the right-hand side of the chamber. The lift gas after reaching the right-hand side of the chamber 552 is then directed through a waste line 580 connected to a burner unit 538 for use as fuel for heating the glycol in the reboiler 516. The burner unit 538 is supplied with additional fuel gas from the system because the amount of lift gas supplied through the waste line 580 is relatively small. The additional fuel supplied to the burner unit is thermostatically controlled in response to the temperature in the reboiler 516 as well as the temperature in the separator vessel 511. The products of combustion from the burner unit are directed through a fire tube assembly unit 539 extending into the reboiler and then pass out through an exhaust stack 540. During passage of these gases through the fire tube assembly a large quantity of heat is transferred to the glycol in the reboiler to maintain the proper temperature so that water in the glycol will be boiled off.

Because the amount of lift gas required to circulate the glycol is relatively small, the condensing unit 570 is eliminated in many systems. In these systems, the baffle 552c is not installed in the sump chamber 552 and the waste lift gas will pass through line 535 to the vapor space of the regenerator and exhaust with the water vapor through condenser unit 581.

Glycol from the sump chamber 552 is directed through a lower outlet therein through a line 541 connected to an outer heating jacket 542 surrounding a portion of the choke valve mechanism 523. Heat is transferred from the jacket 542 to the expanding well fluid flowing through the choke valve to prevent freezing and solidification of the liquid components in the well fluid as they enter the separator vessel 511. The glycol is then directed from the choke heating jacket 542 via a line 543 to the inlet header of a heat exchanger 544 disposed in indirect heat transfer relation in the liquid collecting section 519 of the vessel. The hot glycol passing through the heat exchanger 544 supplies heat to the collected liquids in the vessel to prevent freezing and solidification and aid in breaking water-oil emulsions that tend to form. The amount of heat supplied by the heat exchanger is dependent on the temperature and flow rate of the glycol, the latter being responsive to the flow rate of lift gas.

Glycol leaves the heat exchanger 544 through an outlet header connected to a short pipe 545 which directs the glycol into a heating jacket 546 on the underside of the vessel 511 for heating the vessel and its contents. The jacket 546 supplies additional heat below the liquid collecting sections 519 and 520 to prevent freezing and solidification of the collected liquid and the glycol passing through the jacket is then returned to the reboiler 516 through a return line 547.

In order to reconcentrate and remove water from the wet glycol returned to the reboiler from the dehydrator sump 529, the reboiler is maintained at a temperature high enough to boil off the water vapor. The water vapor as it is boiled off passes upwardly through an inlet tube 581a to a glycol condenser unit 581 filled with packing wherein any glycol vapor that is boiled off with the water vapor is condensed and returned to the reboiler. Water vapor passes on through the unit and is discharged into the atmosphere through a vent line 581b. Details and operation of the unit 581 and details and function concerning the interconnection of the dry glycol sump tank 515 and reboiler 516 are shown and described in U.S. Patent No. 3,132,987 and reference should be had to this patent.

The system 510 provides a new and unique method of operating a liquid separation and dehydration system for well fluid wherein the dry gas separated from the liquid components of the well fluid is used to provide positive circulation of a liquid desiccant such as glycol and is also used to aid in reconcentrating the glycol in the system. In order to reconcentrate the glycol and remove collected water therefrom, the glycol is heated to a temperature sufficient to boil off the water vapor and the boiled off water vapor and any glycol therewith are separated and the separated glycol is returned to the system. Dry gas from the well fluid is utilized in the gas lift to further aid in reconcentrating the liquid desiccant or glycol as well as for elevating the glycol for circulation through a heat exchange system. The dry gas is directed in an upward stream within a conduit of a confining riser tube wherein the wet glycol is drawn upwardly in a concurrent stream to intimately mix with the gas. During the intimate mixing of the gas and wet glycol in the confined stream, additional water is removed from the glycol to further reconcentrate the glycol. This is accomplished because the dry lift gas acts as a non-miscible third component in the system which would otherwise consist of only two completely miscible components (i.e., water and glycol). Since the lift gas at this phase in the system is in a superheated condition, it exerts a partial pressure effective to reduce or lower the partial pressures of the water and glycol and accordingly additional water is vaporized by differential vaporization. The dry gas, in addition to lifting of the glycol for circulation through the system, acts as a stripping gas to remove water from the glycol and thus reconcentrate the glycol to a greater extent than possible by vaporization alone in the reboiler. The system 510, illustrated in FIG. 5 and described in the specification, thus offers many advantages in construction and operation over other dehydration and liquid separating systems.

Figure 6:
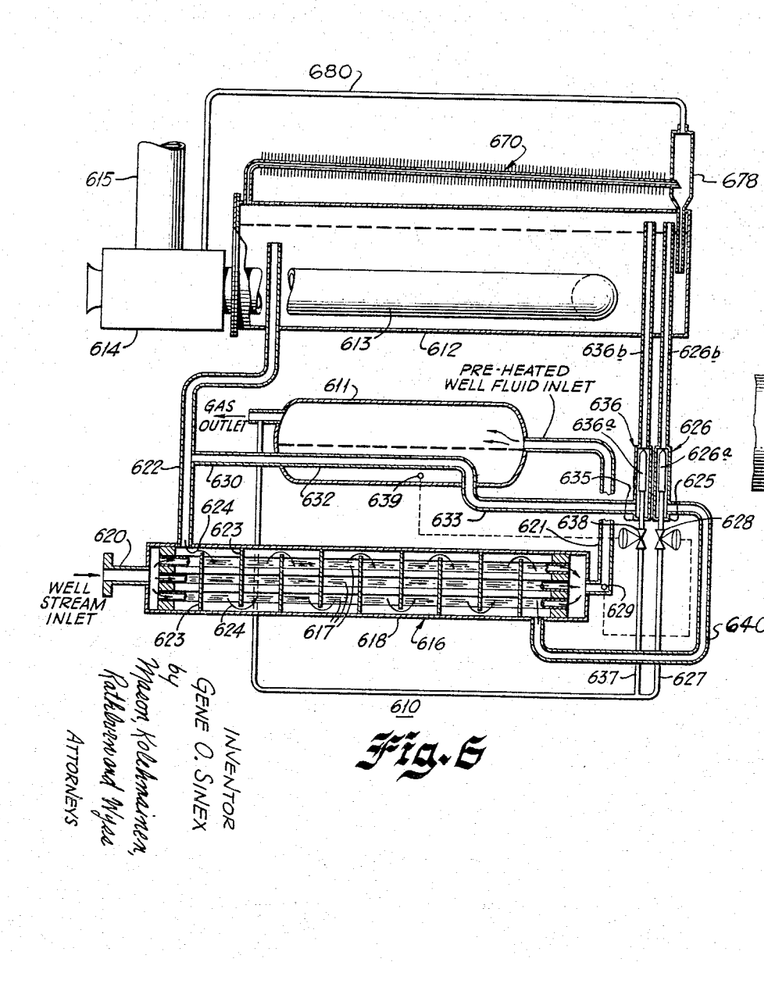
FIG. 6 is a schematic view, partially in section, of another embodiment of a multi-component liquid separation and dehydration system constructed in accordance with the present invention.

Referring now to FIG. 6, there is illustrated schematically another embodiment of a multi-component liquid separation system 610 constructed in accordance with the features of the present invention. The system 610 includes a separator vessel 611 similar to those of previous embodiments and having liquid collecting sections, dry gas collecting sections, a dry gas collecting space, a well fluid inlet and a dry gas outlet. A heating tank or reboiler 612 is provided for containing a heated supply of liquid heat transfer medium such as water or glycol, the latter being utilized in systems wherein a liquid desiccant is needed for operation of a well gas dehydrating system. The tank or reboiler 612 is provided with a fire tube assembly 613 submersed in the liquid medium to supply heat thereto required for maintaining the medium at the desired operating temperature. A burner unit 614 connected to the fire tube assembly supplies the required high temperature products of combustion which pass through the fire tube assembly and out through a stack 615.

Instead of a high pressure flow coil within the heater tank 612 as utilized in the embodiments of FIGS. 1, 2 and 3, the system 610 includes a separate heat exchange vessel 616 having a plurality of tubes 617 surrounded by an outer shell 618. Well fluid is first introduced into the left-hand end of the heat exchanger vessel through an inlet 620 and flows through the tubes 617 to the right-hand end of the vessel and out through a line 621 connected to the inlet of the separator vessel 611. Heat transfer medium is taken from the heater tank or reboiler 612 through a line 622 connected to the outer shell 618 of the heat exchange vessel. The medium flows through the vessel around the inner tubes 617 and supplies heat to the well fluid flowing therein. A plurality of flow reversing baffles 623 are provided in the vessel 616 to direct the flow of the heat transfer medium around the tubes 617 in the directions indicated by the arrows 624. When the transfer medium passes the last of the baffles 623 it flows out of the vessel 616 through a line 640 into a sump 625 of a gas powered lift unit 626 similar to those previously described. The lift unit 626 includes a gas nozzle 626a and riser tube 626b which extends vertically upward into the heater tank 612 above the liquid level therein. Lift gas is supplied to the nozzle 626a through a lift gas supply line 627 connected to the dry gas outlet or dry gas collecting space of the separator vessel 611. The flow rate of lift gas through the line 627 is controlled by means of flow control valve 628 which is actuated in response to the temperature of the well fluid leaving the separator vessel 616 by means of a temperature sensitive device 629.

In order to supply needed heat to the separator vessel 611 to prevent freezing and solidification of the collected liquid and aid in breaking up water-oil emulsions, the heat transfer medium is directed through an inlet line 630 branching from the line 622 into a heat exchanger 632 disposed in indirect heat exchange relation within the liquid collecting sections of the separator vessel 611. The heat transfer medium after passing through the heat exchanger 632 is directed through a line 633 to a sump 635, similar to the sump 625, of a second gas-powered lift device 636. The lift device 636 includes a gas nozzle 636a and a riser tube 636b which extends vertically upward into the heater tank 612 above the liquid level therein. Lift gas is supplied to the nozzle 636a through a line 637 connected or branched off of the lift gas supply line 627. As lift gas moves through the nozzle 636a liquid transfer medium in the sump 635 is carried upwardly in the riser tube 636b into the heater tank 612. The flow rate of lift gas to the lift unit 636 is controlled by a valve 638 actuated in response to the temperature of the collected liquids in the separator vessel 611 by means of a temperature responsive sensitive device 639.

The mixtures of lift gas and heat transfer medium reaching the upper open ends of the riser tubes 626b and 636b enter the space above the liquid level in the heater tank or reboiler 612 and the heat transfer medium gravitates out of the mixture and collects with the liquid in the tank. The remaining lift gas collected in the upper portion of the reboiler tank 612 may still contain small quantities of the heat transfer medium in droplet or vapor form and in order to prevent loss of this medium the lift gas is directed through a condensing unit 670 wherein the medium is separated from the gas stream by condensing it in liquid form and returning it the heater tank or reboiler. The unit 670 may be of the externally finned air-cooled type as illustrated in FIG. 6 or of the jacketed type wherein incoming lift gas is preheated during cooling of the outgoing lift gases. In either case, the liquid medium condensed drains down the condenser unit to an upstanding return stack 678 and is returned to the heater tank and the cooled gas passes out the top of the return stack through a waste line 680 to the burner unit 614 for consumption as fuel.

Since the lift units 626 and 636 are delivering quantities of heat transfer medium to the heater tank or reboiler 612 at flow rates in accordance with the heat needs of the separator vessel 611 and heat exchanger vessel 616 and since quantities of heat transfer medium are taken from the heater tank for circulation through the heat exchanger vessel 616 and heat exchanger 632 in the vessel 611, positive circulation of the medium is insured. The lift gas provides the motive force for the positive circulation by elevating quantities of the medium to a level higher than the liquid level in the tank or reboiler 612.

The use of two separate lift devices provides for better operating efficiencies and heat distribution within the system since heat flow to the various components of the system can be accurately controlled.

Figure 7:
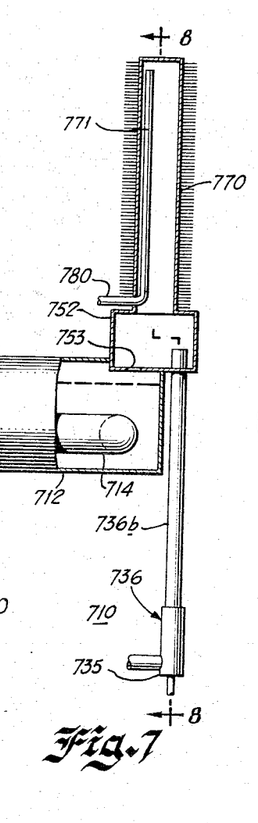
FIG. 7 is a fragmentary elevational view, partially in section, of another embodiment of gas lifting and medium circulating means constructed in accordance with the present invention.
Figure 8:
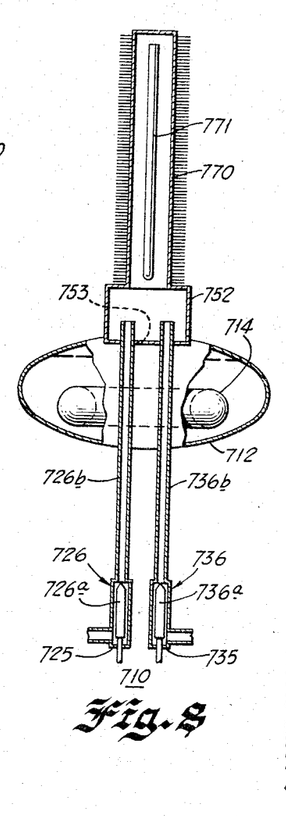
FIG. 8 is a sectional view taken substantially along line 8—8 of FIG. 7.

FIGS. 7 and 8 illustrate another embodiment of gas lifting and medium circulation and condensing means 710 constructed in accordance with the present invention. The system 710 includes a heater tank or reboiler 712 for containing a heated supply of liquid heat transfer medium such as water or a dehydrating liquid such as glycol. Heat is supplied to the tank or reboiler 712 by means of a fire tube assembly 714 one end of which is connected to a gas burner unit (not shown) for receiving a flow of heated products of combustion therefrom. The heat transfer medium moves from the tank or reboiler 712 through various components of the system (not shown) to supply needed heat thereto and then is returned to a pair of return sumps 725 and 735 for elevation back into the tank by a pair of gas-powered lift devices 726 and 736 associated with the respective sumps.

The lift units include gas nozzles 726a and 736a and riser tubes 726b and 736b extending vertically upward into a single chamber 752 above the level of liquid in the tank or reboiler 712. A mixture of lift gas and heat transfer medium flows upwardly in each of the riser tubes until reaching the upper open ends where the major portion of the liquid medium gravitates out of the upwardly moving streams and is returned to the tank or reboiler through a drain and vent opening 753 in the floor of the chamber 752.

Lift gas in the chamber 752 moves upwardly into an externally finned air-cooled condensing unit 770 wherein any medium still remaining in the gas stream is droplet or vapor form is condensed out and drains back down the walls of the condenser into the chamber 452 for return to the reboiler. The lift gas after the medium has been condensed out then moves downwardly through a line 771 connected to a waste line 780 leading to the burner unit (not shown) of the system.

The system 710 thus provides a simple structure for reducing the losses of heat transfer medium and returning the recovered medium to the burner.

Although the present invention has been described with reference to several illustrative embodiments thereof, it should be understood that numerous other modifications and embodiments can be devised by those skilled in the art that will fall within the spirit and scope of the principles of this invention.

What is claimed and desired to be secured by Letters Patent of the United States is:

1. A dehydrating and recirculating method for treating well fluids containing liquid and gaseous components, comprising passing a circulating liquid desiccant in intimate contact with the gaseous components of the well fluid to absorb moisture therefrom and collecting the resultant dry gas, heating said desiccant to a temperature so as to cause the water to vaporize, separating the resultant water vapor from the desiccant to produce partially reconcentrated desiccant, and subsequently elevating and reconcentrating said desiccant by intimate contact with said dry gas in a gas lift for circulating said desiccant and for removing moisture therefrom during elevation.

2. An apparatus for treating well streams including gas and liquid components comprising a separator vessel having a liquid collecting section and a dry gas space from which dry gas can be withdrawn, heat exchanging means in indirect heat exchange relation with the liquid collecting section, a heating tank for containing a quantity of heat transfer liquid, liquid conveying means placing the heat exchanging means in communication with the heating tank for circulation of the heat transfer liquid through the heat exchanging means, gas lift means for elevating heat exchange liquid above the liquid level in the heating tank, and means connected to the dry gas space in the separator vessel for supplying dry gas from the separator vessel to the gas lift means.

3. The apparatus set forth in claim 2 including burner means for heating the heat transfer liquid in said heating tank, and means for recovering the gas from said gas lift means and supplying the recovered gas to the burner means.

4. An apparatus for treating well streams including gaseous and liquid components comprising a separator vessel having a liquid collecting section and a dry gas space from which dry gas can be withdrawn, heat exchanging means in indirect heat exchange relation with the liquid collecting section, a heating tank for containing a quantity of heat transfer liquid, liquid conveying means placing the heat exchanging means in communication with the heating tank for circulating the heat exchange liquid through the heat exchanging means, said conveying means including a heat transfer liquid collecting chamber disposed at an elevation above the liquid level in said heating tank, gas lift means for moving a body of the heat transfer liquid into the chamber and including gas lift nozzle means disposed in the conveying means at a point below the level of the heat transfer liquid in the heating tank, and means communicating with the dry gas space in the separator vessel for supplying gas from the separator vessel to the gas lift nozzle means.

5. An apparatus for deriving dry gas from a well stream comprising a separator vessel providing a liquid collecting space and a dry gas collecting space, outlet means for withdrawing dry gas and collected liquids from the separator vessel, heat exchanging means for supplying heat to the vessel, a heating tank containing a quantity of a heat transfer medium, conveying means placing the heating tank and the heat exchanging means in a transfer medium circulating loop, nozzle means in the circulating loop for mixing gas and the heat transfer medium to circulate the medium through the loop, and means connected to the dry gas collecting space for supplying gas from the gas collecting space to the nozzle means.

6. An apparatus for treating gas streams including liquid components comprising a separator vessel having dry gas space from which dry gas can be withdrawn and structure in the vessel forming a liquid collecting section, heat exchanging means in indirect heat exchange relation with the liquid collecting section, a heating tank for containing a quantity of heat transfer medium, medium conveying means placing the heat exchanging means in communication with the heating tank for circulation of the heat transfer liquid between the heat exchanging means and the heating tank, said conveying means including a collecting chamber for maintaining a quantity of said heat transfer medium at a level above the upper level of medium in said tank, gas lift means in the conveying means for elevating heat transfer medium from the heating tank to said collecting chamber for circulation to said heat exchanger means, and means connected to the dry gas space in the separator vessel for supplying dry gas from the separator vessel to the gas lift means.

7. An apparatus for treating gas streams including liquid components comprising a separator vessel having a dry gas space from which dry gas can be withdrawn and structure in the vessel forming a liquid collecting section, heat exchanging means in indirect heat exchange relation with the liquid collecting section, a heating tank for containing a quantity of heat transfer liquid, liquid conveying means placing the heat exchanging means in communication with the heating tank for the circulation of the heat transfer liquid between the heat exchanging means and the separator vessel, said conveying means including a heat transfer liquid collecting chamber disposed at an elevation at least as high as the heat exchanging means, gas lift means for moving a body of the heat transfer liquid into the chamber and including a gas lift nozzle means disposed in the conveying means at a point below the level of the heat transfer liquid in the heating tank, means communicating with the dry gas space in the separator vessel for supplying gas from the separator vessel to the gas lift nozzle means, separating means in communication with said collecting chamber for separating the heat transfer liquid from a said gas, and means for returning the separated heat transfer liquid to said heating tank.

8. An apparatus for deriving dry gas from a well stream comprising a separator vessel providing a liquid collecting space and a dry gas collecting space, inlet means for supplying a well stream to the separator vessel, outlet means for withdrawing dry gas and collected liquids from the separator vessel, heat exchanging means for supplying heat to the vessel, tank means for containing a quantity of a heat transfer medium, conveying means placing the tank means and the heat exchanging means in a medium circulating path, nozzle means in the circulating path for mixing gas and the heat transfer medium to circulate the medium through the path, means connected to the dry gas collecting space for supplying gas from the gas collecting space to the nozzle means, said conveying means including collecting means for maintaining a quantity of medium above the medium level in said tank means to provide circulating of the medium under head through said path, and means for separating the medium and said gas and directing said separated medium to said tank means.

9. Apparatus for use in separating water and liquid hydrocarbons from well fluid comprising a separator vessel having a well fluid inlet, a dry gas outlet and at least one upstanding weir forming a liquid collecting section, heat exchange means in said collecting section for heating said liquid to prevent freezing and solidification thereof, a heating tank for containing a quantity of liquid heat transfer medium, fire tube means extending into said tank for heating the transfer medium therein, gas burner means connected to said fire tube means for directing high temperature products of combustion therethrough to heat said transfer medium, sump means for maintaining a quantity of heated transfer medium at a level above the liquid level in said tank, said sump means including outlet means in communication with said heat exchange means for directing a flow of said transfer medium under head from said sump means through said heat exchange means, means in said heating tank for directing a flow of gas from said dry gas outlet into the transfer medium in said heating tank to lift said medium into said sump means, and means for separating said gas from said transfer medium for use in said burner means for combustion.

10. Apparatus for use in separating water and liquid hydrocarbons from well fluid comprising a separator vessel having a well fluid inlet, a dry gas outlet and a liquid collecting section, heat exchange means in said collecting section for heating said liquid to prevent freezing and solidification thereof, a heating tank for containing a quantity of liquid heat transfer medium, fire tube means extending into said tank for heating the transfer medium therein, gas burner means connected to said fire tube means for directing high temperature products of combustion therethrough to heat said transfer medium, sump means for maintaining a quantity of heated transfer medium at a level above the level in said tank, said sump means including outlet means in communication with an inlet of said heat exchange means for directing a flow of said medium under head from said sump means through said heat exchange means, gas lift means in said heating tank for lifting heated transfer medium into said sump means, said lift means including an upwardly directed gas nozzle connected to said dry gas outlet and a riser tube surrounding said nozzle having a lower open end in communication with the medium in said heating tank and an upper open end communicating with said sump means and spaced upwardly from the outlet means thereof, and means for separating said lift gas from said medium and directing said lift gas to said burner means.

11. Apparatus for use in separating water and hydrocarbons from well fluid comprising a separator vessel having a well fluid inlet at one end, a dry gas outlet at the other end and an upstanding weir dividing the lower portion of said vessel into liquid collecting sections for collecting the liquids separated from said well gas, heat exchange means in at least one of said collecting sections for heating the collected liquid to prevent freezing and solidification thereof, a heating tank for containing a quantity of liquid heat transfer medium, fire tube means extending into said tank for heating the transfer medium therein, gas burner means connected to said fire tube means for directing high temperature products of combustion therethrough to heat said medium, medium collecting means above the level of said medium in said heating tank for maintaining a head of heated medium, said medium collecting means including outlet means in communication with said heat exchange means for directing a flow of said medium under head through said heat exchange means, lift means in said heating tank for lifting said heated medium into said medium collecting means, said lift means including an upwardly directed gas nozzle connected to said dry gas outlet and a riser tube surrounding said nozzle having a lower open end in communication with the medium in said heating tank and an upper open end communicating with said medium collecting means and spaced upwardly from said outlet means thereof, and means in communication with said medium collecting means for separating the lift gas from said medium and directing said separated gas to said burner means.

12. Apparatus for use in separating water and liquid hydrocarbons from well fluid comprising a separator vessel having a well fluid inlet at one end, a dry gas outlet at the other end, a first liquid collecting section adjacent the inlet of the vessel and a second liquid collecting section for collecting lighter liquids, heat exchange means in said first collecting section for heating the collected liquid to prevent freezing and solidification thereof, a heating tank for containing a quantity of liquid heat transfer medium, fire tube means extending into said tank for heating the transfer medium therein, gas burner means connected to said fire tube means for directing high temperature products of combustion therethrough to heat said medium, sump means above the level of said medium in said heating tank for maintaining a quantity of heated medium under head, said sump means including outlet means in communication with an inlet of said heat exchange means for directing a flow of said medium under head from said sump means through said heat exchange means, gas lift means in said heating tank adjacent said one end for lifting said heated medium into said sump means, said lift means including an upwardly directed gas nozzle connected to said dry gas outlet and a riser tube having a lower end portion surrounding said nozzle and in communciation with the medium in said heating tank, said riser tube having an upper open end in communication with said sump means and spaced upwardly from the outlet means thereof, means for separating the lift gas from said medium, and conduit means for directing said separated lift gas from said sump means to said burner means.

13. Apparatus for use in separating water and liquid hydrocarbons from well fluid comprising a separator vessel having a well fluid inlet, a dry gas outlet and a liquid collecting section, heat exchange means in said collecting section for heating the collected liquid to prevent freezing and solidification thereof, a heating tank for containing a quantity of liquid heat transfer medium, fire tube means extending into said tank for heating the transfer medium therein, gas burner means connected to said fire tube means for directing high temperature products of combustion therethrough to heat said medium, sump means for maintaining a quantity of heated medium at a level above the upper level of said heat transfer medium in said heating tank, said sump means including outlet means in communication with said heat exchange means for directing a flow of said medium under head from said sump means through said heat exchange means, means in said heating tank for directing a flow of gas from said dry gas outlet into the medium in said heating tank to lift said medium into said sump means, condensing means for separating the lift gas reaching said sump means from said medium, said condensing means including heat exchange means for cooling said lift gas reaching said sump means and warming said gas flowing from said separator vessel to said heating tank, and means for returning the medium separated from said lift gas in said condensing means to said heating tank and directing said gas to said burner means for combustion.

14. Apparatus for use in separating water and liquid hydrocarbons from well fluid comprising a separator vessel having a well fluid inlet, a dry gas outlet and a liquid collecting section, heat exchange means in said collecting section for heating the collected liquid to prevent freezing and solidification thereof, a heating tank for containing a quantity of liquid heat transfer medium, fire tube means extending into said tank for heating the transfer medium therein, gas burner means connected to said fire tube means for directing high temperature products of combustion therethrough to heat said medium, sump means for maintaining a quantity of heated medium at a level above the upper level of said heat transfer medium in said heating tank, said sump means including outlet means in communication with said heat exchange means for directing a flow of said medium under head from said sump means through said heat exchange means, means in said heating tank for directing a flow of gas from said dry gas outlet into the medium in said heating tank to lift said medium into said sump means, means for separating said gas from said medium and returning said medium to said heating tank, means directing said separated gas to said burner means for combustion, and thermally responsive means including a sensing unit in said liquid collection section for controlling the flow of gas into said heating tank thereby to control the rate of lifting of the medium in response to the temperature in said liquid collection section.

15. Apparatus for use in separating water and liquid hydrocarbons from well fluid comprising a separator vessel having a well fluid inlet, a dry gas outlet and a liquid collecting section, heat exchange means in said collecting section for heating the collected liquid to prevent freezing and solidification thereof, a heating tank for containing a quantity of liquid heat transfer medium, fire tube means extending into said tank for heating the transfer medium therein, gas burner means connected to said fire tube means for directing high temperature products of combustion therethrough to heat said medium, sump means for maintaining a quantity of heated medium at a level above the upper level of said transfer medium in said heating tank, said sump means including outlet means in communication with said heat exchange means for directing a flow of said medium under head from said sump means through said heat exchange means, overflow means extending upwardly into said sump means to a selected level for limiting the head of said medium in said sump and returning excess medium to said heating tank, thermally responsive means including a sensing unit in said liquid collecting section for regulating the flow of medium through said heat exchange means to maintain the temperature of collected liquid at a selected level, gas lift means in said heating tank for lifting said heated medium into said sump means, said lift means including an upwardly directed gas nozzle connected to said dry gas outlet and a riser tube having a lower open end surrounding said nozzle having an upper open end in communication with said sump means and spaced upwardly from the outlet means thereof, and means for separating said lift gas from said medium and directing said separated gas to said burner means and returning said medium to said heating tank.

16. Apparatus for use in separating water and liquid hydrocarbons from well fluid comprising a separator vessel having a well fluid inlet, a dry gas outlet, and a liquid collecting section, heat exchange means in said collecting section, a heating tank for containing a quantity of liquid heat transfer medium, fire tube means extending into said heat transfer medium therein, gas burner means connected to said fire tube means for directing high temperature products of combustion therethrough to heat said medium, sump means for maintaining a quantity of heated medium at a level above the upper level of said transfer medium in said heating tank, said sump means including outlet means in communication with said heat exchange means for directing a flow of said medium under head from said sump means through said heat exchange means, gas lift means in said heating tank for lifting said heated medium into said sump means, said lift means including an upwardly directed gas nozzle connected to the dry gas outlet and a riser tube having a lower open end surrounding said nozzle and an upper open end communicating with said sump means, means for cooling said lift gas reaching said sump means and separating said medium therefrom, and means for directing said cooled gas to said burner means.

17. Apparatus for use in separating water and liquid hydrocarbons from well fluid comprising a separator vessel having a well fluid inlet, a dry gas outlet and a liquid collecting section, choke means connected to said well fluid inlet for reducing the pressure of well fluid entering said separator vessel, heat exchange means in said collecting section for heating the collected liquid to prevent freezing and solidification thereof, a heating tank for containing a quantity of heat transfer medium, fire tube means extending into said tank for heating the transfer medium therein, gas burner means connected to said fire tube means for directing high temperature products of combustion therethrough to heat said medium, sump means for maintaining a head of heated medium above the upper level of said heat transfer medium in said heating tank, conduit means connected to said sump means for directing a flow of said medium under head to heat said choke means and through said heat exchange means in said separator vessel for heating the collected liquids therein, means for directing a flow of gas from said dry gas outlet into the medium in said heating tank to lift said medium into said sump means, and means in communication with said sump means for separating said lift gas from said medium and directing the separated gas to said burner means.

18. Apparatus for use in separating water and liquid hydrocarbons from well fluid comprising a separator vessel having a well gas inlet, a dry gas outlet and a liquid collecting section for collecting liquids separated from said well gas, heat exchange means in said collecting section for heating collected liquid to prevent freezing and solidification thereof, a heating tank for containing a quantity of heat transfer medium, fire tube means extending into said tank for heating the transfer medium therein, gas burner means connected to said fire tube means for directing high temperature products of combustion therethrough to heat said medium, medium collecting means above the upper level of said transfer medium in said heating tank for maintaining a head of heated medium, said medium collecting means comprising a closed chamber and including outlet means in communication with said heat exchange means for directing a flow of said medium under head through said heat exchange means, gas lift means in said heating tank for lifting said heated medium into said medium collecting means, said lift means including an upwardly directed gas nozzle connected to said dry gas outlet and a riser tube having a lower open end in communication with the medium in said heating tank and surrounding said nozzle, said riser tube having an upper open end communicating with said closed chamber, drain pipe means in communication between said closed chamber and said heating tank for equalizing the pressures therein and limiting the upper level of liquid medium in said chamber, and means in communication with said medium collecting means for separating the lift gas from said medium and directing said separated gas to said burner means, said last mentioned means including cooling condenser means comprising a pair of upstanding finned cooling tubes connected together at their upper ends and connected to said closed chamber at their lower ends to pass gas upwardly through one tube and downwardly through the other to effect separation of the liquid medium therefrom.

19. Apparatus for use in separating water and liquid hydrocarbons from well fluid comprising a separator vessel having a well fluid inlet, a dry gas outlet and a liquid collecting section, heat exchange means in said collecting section for heating collected liquid to prevent freezing and solidification thereof, a heating tank for containing a quantity of heat transfer medium, fire tube means extending into said tank for heating the transfer medium therein, gas burner means connected to said fire tube means for directing high temperature products of combustion therethrough to heat said medium, a medium collecting chamber for maintaining a head of heated medium above the upper level of said transfer medium in said tank, said chamber connected in communication with said heat exchange means for directing a flow of said medium under head therethrough, gas lift means in said heating tank connected to said dry gas outlet for lifting said medium into said collecting chamber, means for separating lift gas from said transfer medium including an inner tube communicating between said medium collecting chamber and said heating tank, and outer jacket means surrounding said inner tube for pre-heating gas flowing to said lift means from said dry gas outlet.

20. Apparatus for use in separating water and liquid hydrocarbons from well fluid comprising a separator vessel having a well fluid inlet, a dry gas outlet liquid collecting section for collecting liquids separated from said well gas, heat exchange means in said collecting section for heating the collected liquid to prevent freezing and solidification thereof, a heating tank for containing a quantity of liquid heat transfer medium, fire tube means extending into said tank for heating the transfer medium therein, gas burner means connected to said fire tube means for directing high temperature products of combustion therethrough to heat said medium, medium collecting means in said heating tank including a bottom wall above the upper level of said heat transfer medium in said tank for maintaining a head of heated medium, said bottom wall having outlet means in communication with said heat exchange means for directing a flow of said medium under head through said heat exchange means, gas lift means in said heating tank end for lifting said heated medium into said medium collecting means, said lift means including an upwardly directed gas nozzle in communication with the dry gas outlet and a riser tube having a lower open end in communication with the medium in said heating tank surrounding said nozzle and an upper open end communicating with said medium collecting means, lift gas separator and medium condensing means including an inner tube connected between said medium collecting means and said heating tank and an outer jacket surrounding said inner tube connected between said dry gas outlet and said gas lift means, and means for directing said separated gas to said burner means.

21. Apparatus for treating well streams having liquid and gas components comprising a separator vessel having a well stream inlet, a dry gas outlet and a liquid collecting section, heat exchange means in indirect heat exchange relation with the liquid collecting section for heating liquids collected therein, a heating tank for containing and heating a quantity of heat transfer medium, a well fluid heater in said heating tank in indirect heat exchange relation with the transfer medium therein, said heater having inlet means adapted for connection to a supply of well fluid and an outlet in communication with the well stream inlet of said separator vessel and medium circulating means in communication between said heating tank and heat exchange means for directing a flow of medium through the latter, said circulating means including gas lift means in said heating tank for elevating said medium from said tank to flow through said heat exchange means, said lift means including nozzle means connected to the dry gas outlet for directing a flow of lift gas to elevate said medium.

22. Apparatus as defined in claim 21 including choke means in communication between the outlet of said fluid heater and well fluid inlet of said separator vessel for reducing the pressure of the heated well fluid entering the separator vessel.

23. A dehydrating and liquid separating system for treating well fluids containing liquid and gaseous components, said system comprising a reboiler for reconcentrating a supply of liquid desiccant, a dehydrator for removing moisture from the well fluid, said dehydrator including a contactor wherein said liquid desiccant is passed in intimate contact with the gaseous component of the well fluid to absorb moisture therefrom, means for collecting dry gas after passage through said contactor, and gas powered lift means introducing a portion of said collected dry gas into intimate mixing relation with the liquid desiccant in said reboiler for elevating said desiccant for circulation through said system and for removing moisture from said desiccant during elevation.

24. A dehydrating and liquid separating system for treating well fluid containing liquid and gaseous components, said system comprising a reboiler for reconcentrating a supply of liquid desiccant, a separator vessel including a well fluid inlet, a dry gas outlet, a liquid collecting section and gas collecting space, a heat exchanger in indirect heat exchange relation within said liquid collecting section, a dehydrator in said vessel for removing moisture from the gas collected in said gas collecting space, said dehydrator including a contactor wherein said liquid desiccant is passed in intimate contact with the gas collected in said gas collecting space for absorbing moisture therefrom, sump means for maintaining a supply of liquid desiccant at an elevated head above the desiccant level in said reboiler, gas powered lift means in said reboiler connected to introduce dry gas into intimate mixing relation with said desiccant for elevating said desiccant into said sump means and absorbing moisture therefrom during elevation, and means interconnecting said sump means and said heat exchanger for directing circulation of said desiccant through said exchanger.

25. Apparatus as defined in claim 24 including means for controlling the flow rate of lift gas to said lift means in response to the temperature in said liquid collecting section of said vessel.

26. Apparatus for separating liquid from the gaseous components of well fluid comprising a separator vessel including a liquid collecting section, a gas collecting space and a well fluid inlet; a heat exchanger in said vessel for heating liquids collected therein; a heat exchange vessel including first means for passing well fluid through the vessel and second means in indirect heat exchange relation with said first means for passing heat transfer medium through said vessel to preheat the well fluid, an indirect heater tank for containing and heating a quantity of said heat transfer medium, means for supplying heat transfer medium to said heat exchanger and said first means, first return means for returning said heat transfer medium from said heat exchanger to said heater tank and second return means for returning said heat transfer medium to said heater tank, each of said return means including gas powered lift means for elevating said heat transfer medium into said heater tank, and conduit means for supplying gas from the gas collecting space of said separator vessel to said lift means.

27. Apparatus as defined in claim 26, wherein said first return means includes control valve means in the conduit means thereof for controlling the flow rate of lift gas to said lift means in response to the temperature in the separator vessel and said second return means includes control valve means in the conduit means thereof for controlling the flow rate of lift gas to said lift means in response to the temperature of said preheated well fluid leaving said first means of said heat exchange vessel.

28. Apparatus as defined in claim 26 including separator means in communication with said first and second return means for separating said lift gas from said heat transfer medium and returning the latter to said heater tank.

29. In a system for treating well streams of the type including liquid and gaseous components, a well stream inlet to the system and a gaseous component outlet, a separator vessel connected in the system between the well stream inlet and the gaseous component outlet for separating the liquid and gaseous components of the well stream and including a liquid collecting space and a gas collecting space, said separator vessel including an inlet, a heat exchanger means in said separator vessel for heating the contents therein, a heating tank containing a quantity of heat transfer medium, conveying means placing the heating tank and the heat exchanger means in a heat transfer medium circulating loop, gas lift means in said loop for mixing gas and the heat transfer medium to circulate the medium through the loop, and means connected to the system downstream from the inlet to the separator vessel and to the gas lift means for supplying gaseous components separated from the well stream to the gas lift means.

30. The apparatus of claim 29 including control means responsive to the temperature in said separator vessel for regulating the flow of gaseous components to said gas lift means.

31. The apparatus of claim 29 wherein said loop includes means for maintaining a head of said fluid heat exchange medium above said heat exchanger in communication therewith, and wherein said gas lift means circulates said medium to said head maintaining means.

References Cited by the Examiner

UNITED STATES PATENTS

| | | | |
|---|---|---|---|
| 2,759,715 | 8/1956 | Alexander | 261—77 |
| 2,765,045 | 10/1956 | Myers | 55—174 |
| 3,119,674 | 1/1964 | Glasgow et al. | 55—174 |
| 3,132,987 | 5/1964 | Sinex | 55—31 |
| 3,136,834 | 6/1964 | Lorenz | 55—36 |

REUBEN FRIEDMAN, *Primary Examiner.*

C. HART, *Assistant Examiner.*